United States Patent
Yunoue et al.

(10) Patent No.: US 9,889,750 B2
(45) Date of Patent: Feb. 13, 2018

(54) ELECTRIC CONSTRUCTION MACHINE

(71) Applicant: Hitachi Construction Machinery Tierra Co., Ltd., Koka-shi, Shiga (JP)

(72) Inventors: Masayuki Yunoue, Koka (JP); Tatsuo Takishita, Koka (JP); Hajime Kurikuma, Komaki (JP)

(73) Assignee: Hitachi Construction Machinery Tierra Co., Ltd., Koka-shi (JP)

( * ) Notice: Subject to any disclaimer, the term of this patent is extended or adjusted under 35 U.S.C. 154(b) by 324 days.

(21) Appl. No.: 14/422,196

(22) PCT Filed: Jun. 19, 2013

(86) PCT No.: PCT/JP2013/066831
§ 371 (c)(1),
(2) Date: Feb. 18, 2015

(87) PCT Pub. No.: WO2014/030415
PCT Pub. Date: Feb. 27, 2014

(65) Prior Publication Data
US 2015/0231974 A1    Aug. 20, 2015

(30) Foreign Application Priority Data

Aug. 21, 2012  (JP) ................................ 2012-182534

(51) Int. Cl.
*B60L 11/18* (2006.01)
*E02F 9/20* (2006.01)

(52) U.S. Cl.
CPC ....... *B60L 11/1801* (2013.01); *B60L 11/1803* (2013.01); *B60L 11/1809* (2013.01); *E02F 9/2091* (2013.01)

(58) Field of Classification Search
CPC ...... B60L 11/1809; B60L 11/11; E02F 9/2091
(Continued)

(56) References Cited

U.S. PATENT DOCUMENTS 9,150,113 B2 * 10/2015 Ichikawa ............ B60L 11/1803
9,333,868 B2 *  5/2016 Uchida ............... B60R 16/0239
(Continued)

FOREIGN PATENT DOCUMENTS

JP    2009-215855 A    9/2009
JP    2009-278706 A   11/2009
(Continued)

OTHER PUBLICATIONS

Japanese Office Action issued in counterpart Japanese Application No. 2012-182534 dated Jun. 23, 2015 (three (3) pages).
(Continued)

*Primary Examiner* — Daniel Kessie
(74) *Attorney, Agent, or Firm* — Crowell & Moring LLP

(57) ABSTRACT

Provided is an electric construction machine adapted to prevent an electric current, after flowing in via a junction at which power transmission systems join together, from flowing into at least one connector to which an external power supply is not connected.
Power transmission systems 71A, 71B, 71C connected to connectors 59A, 59B, 59C are all caused to join with a common system 73 at a junction before being connected to a control unit 35. The power transmission systems 71A, 71B, and 71C include switches 74Aa, 74Ab, 74Ba, 74Bb, 74Ca, 74Cb. In relay circuits 75A, 75B, 75C, when a plug for an external power supply is connected to corresponding one of the connectors 59A, 59B, 59C, connection of the corresponding connector connection detecting terminals and plug connection detecting terminals energizes a coil of the corresponding control relay (either 76A, 76B, or 76C), then after switching contact points of the corresponding control relay to a closed state, energizes coils of the corresponding switches via the contact points, and switches contact points of the corresponding switches to a closed state.

2 Claims, 15 Drawing Sheets

(58) Field of Classification Search
USPC .................................................. 307/9.1, 10.1
See application file for complete search history.

(56) References Cited

U.S. PATENT DOCUMENTS

| | | | |
|---|---|---|---|
| 2009/0165450 A1* | 7/2009 | Cherney | E02F 9/2203 60/413 |
| 2011/0024255 A1* | 2/2011 | Gomm | B60K 6/387 192/84.1 |
| 2011/0198141 A1* | 8/2011 | Clark | B60K 6/48 180/65.265 |

FOREIGN PATENT DOCUMENTS

| | | |
|---|---|---|
| JP | 2011-15548 A | 1/2011 |
| JP | 2011-172408 A | 9/2011 |
| JP | 2012-1889 A | 1/2012 |

OTHER PUBLICATIONS

International Preliminary Report on Patentability (PCT/IB/338 and PCT/IB/373) dated Mar. 5, 2015, including English translation of document C2 (Japanese-language Written Opinion (PCT/ISA/237)) previously filed on Feb. 18, 2015 (six (6) pages).
International Search Report (PCT/ISA/210) dated Jul. 16, 2013, with English translation (two (2) pages).
Japanese-language Written Opinion (PCT/ISA/237) dated Jul. 16, 2013.

\* cited by examiner

ELECTRIC CONSTRUCTION MACHINE

TECHNICAL FIELD

The present invention relates generally to electric construction machines such as a hydraulic excavator driven by an electric motor, and more particularly, to electric construction machines each include a plurality of connectors to which respective plugs for a plurality of kinds of external power supplies are adapted to be connected.

BACKGROUND ART

Electric hydraulic excavators, one kind of electric construction machine, each include for example an electric motor, a hydraulic pump driven by the electric motor, a plurality of hydraulic actuators (more specifically, a hydraulic cylinder for a boom, a hydraulic cylinder for an arm, a hydraulic cylinder for a bucket, and the like), a plurality of directional control valves that each control a flow of a hydraulic fluid from the hydraulic pump into one of the hydraulic actuators, and operating means that respectively operate the directional control valves (more specifically, for example operating devices that each generate a pilot pressure according to a particular operating position of a control lever and outputs the pilot pressure to a pressure-receiving portion of a corresponding directional control valve). These electric hydraulic excavators are designed so that when an operator operates a directional control valve using the operating means, the fluid that has been delivered from the hydraulic pump is supplied to the corresponding hydraulic cylinder to drive this hydraulic cylinder.

It is known that part of electric hydraulic excavators includes an internal battery, that is, a battery mounted on the vehicle, as an electric power supply source for the electric motor (refer to Patent Document 1 for further details of such an excavator). The electric hydraulic excavator described in Patent Document 1 also includes a chopper device and an inverter. When power from the internal battery is used to drive the electric motor, this DC power from the internal battery is boosted by the chopper device and then the boosted power is further converted into AC power by the inverter and supplied to the electric motor.

In addition, the electric hydraulic excavator described in Patent Document 1 includes a plurality of connectors to which respective plugs for a plurality of kinds of external power supplies are adapted to be connected. It is described that when the plug for one of the external power supplies is connected to corresponding one of the connectors, the internal battery can be charged with the power supplied from that external power supply. It is also described that in the above case, for example if the external power supply connected to the connector is a three-phase 200-VAC power supply, AC power from the external power supply is converted into DC power by the chopper device and this DC power is stepped down by the chopper device and then supplied to the internal battery. In addition, it is described that in the above case, for example if the external power supply connected to the connector is a single-phase 100-VAC power supply, AC power from this external power supply is converted into DC power by the chopper device and this DC power is stepped up by the chopper device and then supplied to the internal battery. It is further described that in the above case, for example if the external power supply connected to the connector in this case is a 220-VDC power supply, DC power from the external power supply is stepped down by the chopper device and then supplied to the internal battery.

PRIOR ART DOCUMENTS

Patent Document

Patent Document 1: JP, A 2012-001889.

SUMMARY OF THE INVENTION

Problems to be Solved by the Invention

In the related art discussed above, for example as shown in FIG. 15, a power transmission system 103A is connected to the connector 102A to which the plug 101A for the three-phase 200-VAC power supply 100A can be connected, a power transmission system 103B to the connector 102B to which the plug 101B for the single-phase 100-VAC power supply 100B can be connected, and a power transmission system 103C to the connector 102C to which the plug 101C for the 100-VDC power supply 100C can be connected. The power transmission systems 103A, 103B, and 103C are provided with overcurrent protectors as circuit breakers 104A, 104B, and 104C, respectively. It is described that a control unit 105 can supply power from a battery device 106 (more specifically, one including a plurality of internal batteries, for example) to an electric motor 107 and drive the motor 107. It is also described that when one of the connectors 102A, 102B, and 102C is connected to the plug for the corresponding external power supply, the control unit 105 can supply to the battery device 106 the power that has been supplied from the external power supply.

For dimensional reduction of the control unit 105 in the related art, it is preferable that as shown, the power transmission systems 103A, 103B, 103C are all caused to join with one common system 108 at a junction before being connected to the control unit 105. In this case, an operator needs only to perform manual operations so that one of the circuit breakers 104A, 104B, 104C that corresponds to the connector to which the corresponding external power supply is connected will be closed and so that the other circuit breakers (i.e., the circuit breakers associated with the connectors to which external power supplies are not connected) will be opened. The operator, however, might inadvertently close the circuit breaker associated with a connector to which an external power supply is not connected. In such a case, an electric current that flows in through the junction where the power transmission systems 103A, 103B, 103C join together will flow into the particular connector to which an external power supply is not connected.

The present invention has been made with the above situation in mind, and an object of the invention is to provide an electric construction machine adapted to prevent an electric current, after flowing in via a junction at which power transmission systems join together, from flowing into at least one connector to which an external power supply is not connected.

Means for Solving the Problem

To attain the above object, an aspect of the present invention provides an electric construction machine includes: an electric motor; a hydraulic pump driven by the electric motor; hydraulic actuators, each driven by a hydraulic fluid delivered from the hydraulic pump; an internal battery that is an electric power supply source for the electric motor; a plurality of connectors to which respective plugs for a plurality of kinds of external power supplies are adapted to be connected; a plurality of power transmission systems each connected to one of the plurality of connectors; and a battery charger to which the plurality of power transmission systems are connected via one common system, the battery charger being configured so that when any one of the plurality of connectors is connected to corresponding one of the plugs for the external power supplies, the battery charger supplies, to the internal battery, electric power supplied from the corresponding external power supply. The electric construction machine further includes: a plurality of switches, each disposed in one of the plurality of power transmission systems and each associated with one of the plurality of connectors; a detection block that detects whether one of the plurality of connectors has been connected to corresponding one of the plugs for the external power supplies or whether one of the connectors has been selected for connection to corresponding one of the plugs for the external power supplies; and a switching control block that conducts switching control so that among the plurality of switches, only the switches associated with the connector detected by the detection block will close and all the other switches will open.

In the above aspect of the present invention, the detection block detects whether one of the plurality of connectors has been connected to corresponding one of the plugs for the external power supplies or whether one of the plurality of connectors has been selected for connection to corresponding one of the plugs for the external power supplies. In addition, the switching control block conducts switching control so that among the plurality of switches, only the switches associated with the connector detected by the detection block will close and all the other switches will open. Thus an electric current that flows in via a junction at which the power transmission systems join together can be prevented from flowing into at least one connector to which an external power supply is not connected.

Effects of the Invention

In accordance with the present invention, the current that flows in via the junction where the power transmission systems join together can be prevented from flowing into at least one connector to which an external power supply is not connected.

MODE FOR CARRYING OUT THE INVENTION

The following describes a first embodiment of the present invention per FIGS. 1 to 11.

Figure 1:
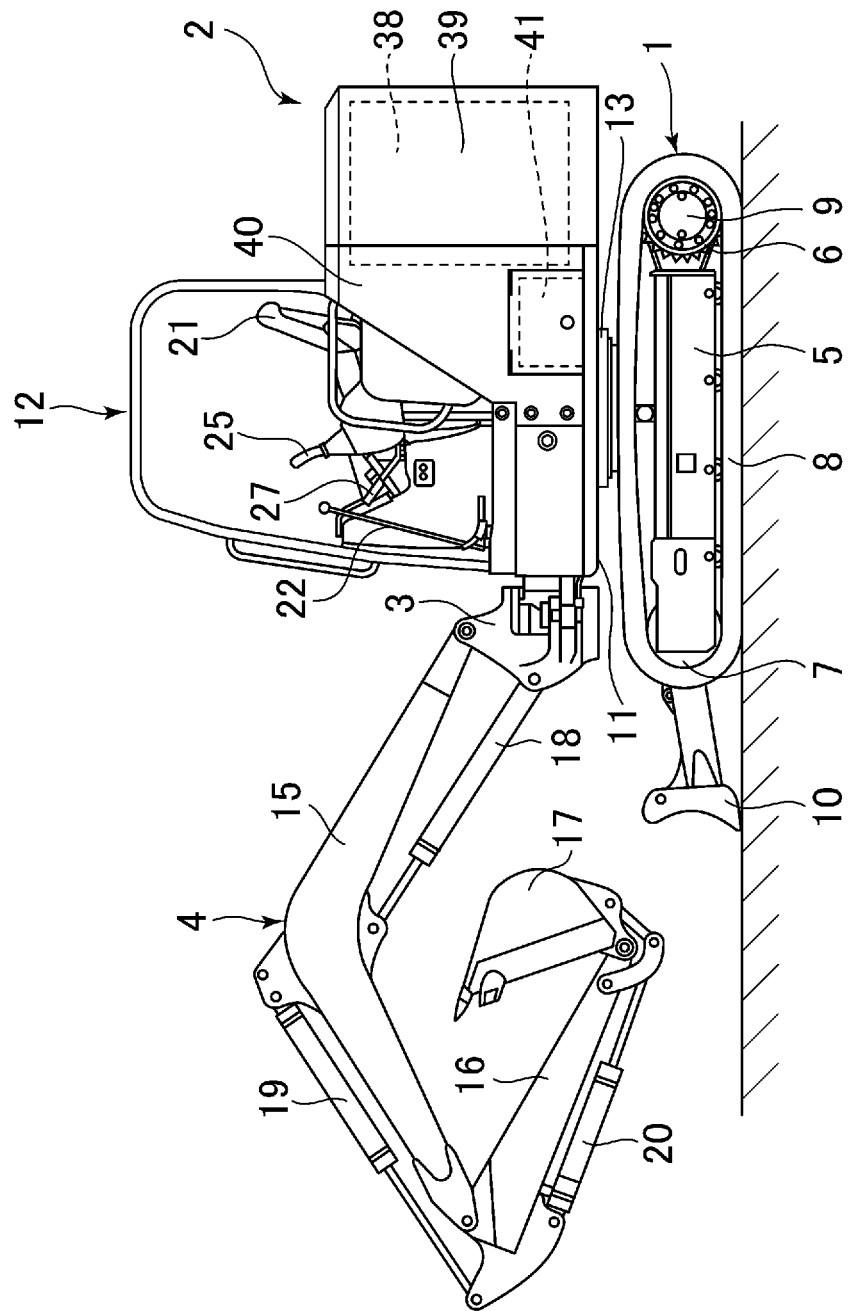
FIG. 1 is a side view that represents overall construction of an electric hydraulic excavator in a first embodiment of the present invention.
Figure 2:
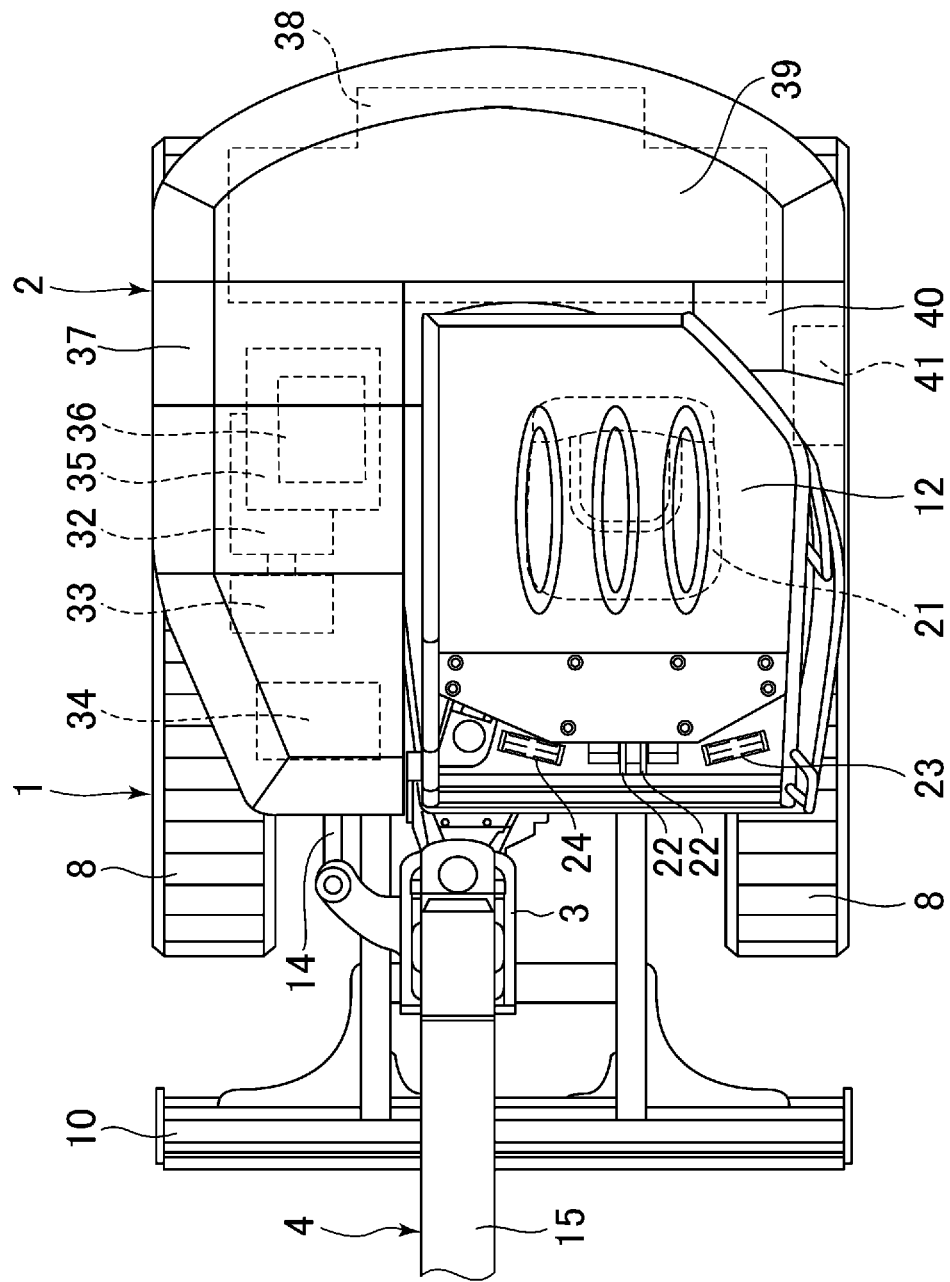
FIG. 2 is a top view that represents the overall construction of the electric hydraulic excavator in the first embodiment of the present invention.

FIG. 1 is a side view that represents overall construction of an electric hydraulic excavator in the present embodiment, and FIG. 2 is a top view representing the construction of the entire hydraulic excavator. In the following explanation, directions "front" (left in FIG. 1), "rear" (right in FIG. 1), "left" (in front of the sheet of FIG. 1) and "right" (behind the sheet of FIG. 1) from the viewpoint of the operator seated on the cab seat of the electric hydraulic excavator in the state shown in FIG. 1 will be referred to simply as "front", "rear", "left" and "right", respectively.

Referring to FIGS. 1 and 2, the electric hydraulic excavator (in the present embodiment, a mini-excavator of an operating mass less than six tons) includes a crawler-type lower track structure 1, an upper swing structure 2 swingably disposed above the lower track structure 1, and a work implement 4 coupled to the front side of the upper swing structure 2 via a swing post 3.

The lower track structure 1 includes a track frame 5 in a shape like "H" as viewed from above. A driving wheel 6 is rotatably supported at a rear left end of the track frame 5, a driven wheel (idler) 7 is rotatably supported at a front left end of the track frame 5, and a left crawler 8 is mounted around the driving wheel 6 and the driven wheel 7. The left driving wheel 6 (i.e., the left crawler 8) is driven by a left hydraulic track motor 9 to rotate. Similarly, a driving wheel 6 is rotatably supported at a rear right end of the track frame 5, a driven wheel (idler) 7 is rotatably supported at a front right end of the track frame 5, and a right crawler 8 is mounted around the driving wheel 6 and the driven wheel 7. The right driving wheel 6 (i.e., the right crawler 8) is driven when driven by a right hydraulic track motor 9 to rotate.

A blade 10 for moving soil is disposed at a front side of the track frame 5 so as to be movable vertically. The blade 10 moves up and down when driven by extension and retraction of a hydraulic blade cylinder not shown.

The upper swing structure 2 includes a swing frame 11 forming a lower substructure thereof, and a canopy type of cab 12 provided on a left front section of the swing frame 11. Centrally on the track frame 5 of the lower track structure 1 is disposed a swing wheel 13, via which the swing frame 11 of the upper swing structure 2 is swingably disposed. The upper swing structure 2 swings with respect to the lower track structure 1 when driven by a hydraulic swing motor not shown.

The swing post 3 is provided in front of the swing frame 11 so as to be able to pivot in a lateral direction of the vehicle. When driven by extension and retraction of a hydraulic swing cylinder 14 not shown, the swing post 3 pivots in the lateral direction and thus swings the work implement 4 to the left and to the right.

The work implement 4 includes a boom 15, an arm 16, and a bucket (working attachment) 17. The boom 15 is connected to the swing post 3 so as to be able to pivot in the vertical direction, and the boom 15 pivots in the vertical direction when driven by a hydraulic boom cylinder 18 that extends and retracts. The arm 16 is connected to the boom 15 so as to be able to pivot in the vertical direction, and the arm 16 pivots in the vertical direction when driven by a hydraulic arm cylinder 19 that extends and retracts. The bucket 17 is connected to the arm 16 so as to be able to pivot in the vertical direction, and the bucket 17 pivots in the vertical direction when driven by a hydraulic bucket cylinder 20 that extends and retracts. The bucket 17 is constructed so that it can be exchanged with, for example, an attachment (not shown) that contains an optional hydraulic actuator.

The cab seat 21 on which the operator sits is provided in the cab 12. Hand- or foot-operable left and right track control levers 22 that specify operation of the respective left and right hydraulic track motors 9 (i.e., the respective left and right crawlers 8) when operated in a front-rear direction are arranged in front of the cab seat 21. An option control pedal 23 that specifies operation of the optional hydraulic actuator (i.e., the attachment) when operated in the lateral direction of the vehicle is disposed at a further left underfoot section of the left track control lever 22. A swinging control pedal 24 that specifies operation of the hydraulic swing cylinder 14 (i.e., the swing post 3) when operated in the lateral direction is disposed at a further right underfoot section of the right track control lever 22.

At the left side of the cab seat 21 is disposed a crosswise operating type of arm/swinging control lever 25 that specifies operation of the hydraulic arm cylinder 19 (i.e., the arm 16) when operated in the front-rear direction, and specifies operation of the hydraulic swing motor (i.e., the upper swing structure 2) when operated in the lateral direction. At the right side of the cab seat 21 is disposed a crosswise operating type of boom/bucket control lever 26 (see FIG. 3 described later herein) that specifies operation of the hydraulic boom cylinder 18 (i.e., the boom 15) when operated in the front-rear direction, and specifies operation of the hydraulic bucket cylinder 20 (i.e., the bucket 17) when operated in the lateral direction. At the right side of the cab seat 21 is also disposed a blade control lever (not shown) that specifies operation of the hydraulic blade cylinder (i.e., the blade 10) when operated in the front-rear direction.

In addition, at the left side of the cab seat 21 (in other words, at an accessway to the cab 12) is disposed a gate lock lever 27 that is actuated to its entry/exit inhibiting position (more specifically, a lowered position for inhibiting the operator from entering or leaving an internal space of the cab) and its entry/exit enabling position (more specifically, a raised position for allowing the operator to enter or leave the internal space of the cab).

Furthermore, elements described later herein, such as a key switch 28 (see FIG. 4), dial 29 (also see FIG. 4), charging switch 30 (also see FIG. 4), and residual battery energy level display/indicator 31 (see FIG. 5), are arranged to the right of the cab seat 21. The charging switch 30 may be disposed on or inside an external power supply input section 41, which is also described later herein.

At the right side of the cab 12 on the swing frame 11 are arranged an electric motor 32, a hydraulic pump 33, a hydraulic fluid tank 34, a control unit 35, and a power distribution panel 36 (see FIGS. 4 and 12 for details of these elements), each of the elements is shrouded with a right side cover 37. At rear of the cab 12 on the swing frame 11 is mounted a battery device 38, which is shrouded with a rear cover 39. The battery device 38 also functions as a counterweight to ensure appropriate weight balancing with the work implement 4. At the left side of the cab 12 is further mounted a left side cover 40, inside which the external power supply input section 41 is disposed.

Figure 3:
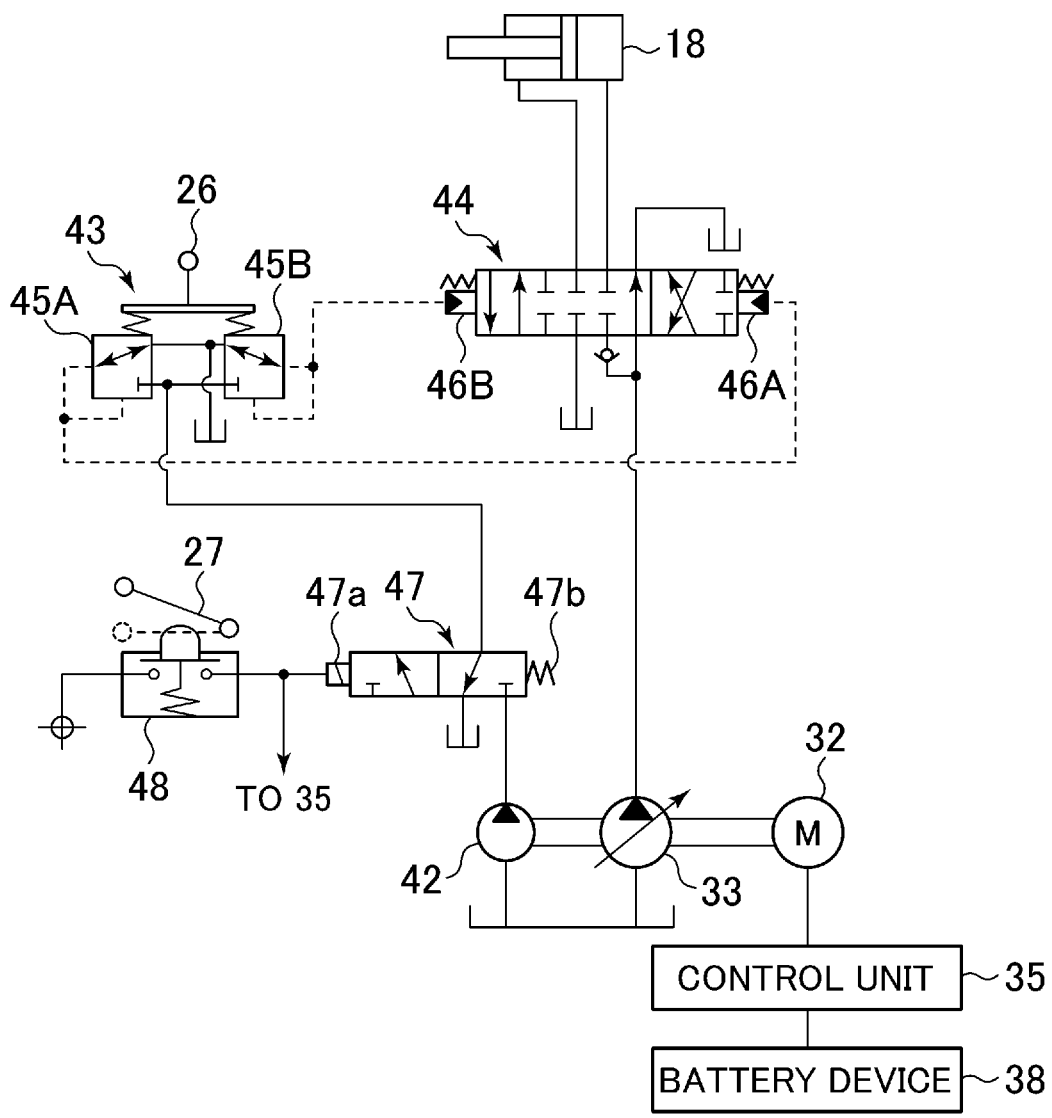
FIG. 3 is a hydraulic circuit diagram that represents only those constituent elements of a hydraulic drive system in the first embodiment of the present invention that relate to a hydraulic cylinder for a boom.

FIG. 3 is a hydraulic circuit diagram that represents only those constituent elements of a hydraulic drive system in the electric hydraulic excavator that relate to the hydraulic boom cylinder 18.

The following elements are arranged in FIG. 3: the electric motor 32; the battery device 38 that is an electric power supply source for the motor 32; the control unit 35 that supplies power from the battery device 38 to the motor 32 and drives the motor 32; the hydraulic pump 33 driven by the motor 32; a pilot pump 42 also driven by the motor 32; a hydraulic pilot type of operating device 43 with the boom/bucket control lever 26; and a boom directional control valve 44 that controls a flow of the hydraulic fluid from the hydraulic pump 33 into the hydraulic boom cylinder 18 in response to front-rear directional operation of the boom/bucket control lever 26.

The operating device 43 includes, for example, the control lever 26, a pilot valve 45A that generates a pilot pressure by reducing a fluid delivery pressure of the pilot pump 42 according to a particular forward operating stroke of the control lever 26 from its neutral position, and a pilot valve 45B that generates a pilot pressure by reducing the fluid delivery pressure of the pilot pump 42 according to a particular backward operating stroke of the control lever 26 from the neutral position.

For example, if the control lever 26 is operated forward, the pilot pressure that the pilot valve 45A generates according to the particular operating stroke is output to a pressure-receiving portion 46A of the boom directional control valve 44, whereby the boom directional control valve 44 is then switched to a right switching position shown in FIG. 3. Thus the fluid from the hydraulic pump 33 is supplied to a rod-end fluid chamber of the hydraulic boom cylinder 18, thereby retracting the hydraulic boom cylinder 18. Conversely if the control lever 26 is operated backward, the pilot pressure that the pilot valve 45B generates according to the particular operating stroke is output to a pressure-receiving portion 46B of the boom directional control valve 44, whereby the boom directional control valve 44 is then switched to a left switching position shown in FIG. 3. Thus the fluid from the hydraulic pump 33 is supplied to a bottom-end fluid chamber of the hydraulic boom cylinder 18, thereby extending the hydraulic boom cylinder 18.

Although not shown, the configuration relating to the left and right hydraulic track motors 9, the hydraulic arm cylinder 19, the hydraulic bucket cylinder 20, the hydraulic swing motor, the hydraulic swing cylinder, and the hydraulic blade cylinder, is substantially the same as the configuration relating to the hydraulic arm cylinder 18. That is to say, the former configuration includes operating devices and directional control valves.

A pilot relief valve (not shown) is connected to a fluid delivery line of the pilot pump 42, and this pilot relief valve governs a maximum fluid delivery pressure of the pilot pump 42. In addition, a lock valve 47 is provided on the fluid delivery line of the pilot pump 42 and the lock valve 47 is designed so as to be switchable in response to the actuation of the gate lock lever 27.

To be more specific, a lock switch 48 is connected to the gate lock lever 27. For example, if the gate lock lever 27 is actuated to the entry/exit inhibiting position (the lowered position), the lock switch 48 has its contacts closed. This energizes a solenoid section 47a of the lock valve 47 via the lock switch 48, thus switching the lock valve 47 to a left switching position shown in FIG. 3. While the lock valve 47 is in this switching position, the fluid delivery pressure from the pilot pump 42 is supplied to the operating devices. As a result, the operating devices become able to generate pilot pressures and set up all hydraulic actuators for operation. Conversely if the gate lock lever 27 is actuated to the entry/exit enabling position (the raised position), the lock switch 48 has its contacts opened. This de-energizes the solenoid section 47a of the lock valve 47, thus switching the lock valve 47 to a neutral position (right) shown in FIG. 3. While the lock valve 47 is in the neutral position, the fluid delivery pressure from the pilot pump 42 is not supplied to the operating devices. As a result, the operating devices become unable to generate the pilot pressures and deactivate all the hydraulic actuators.

Figure 4:
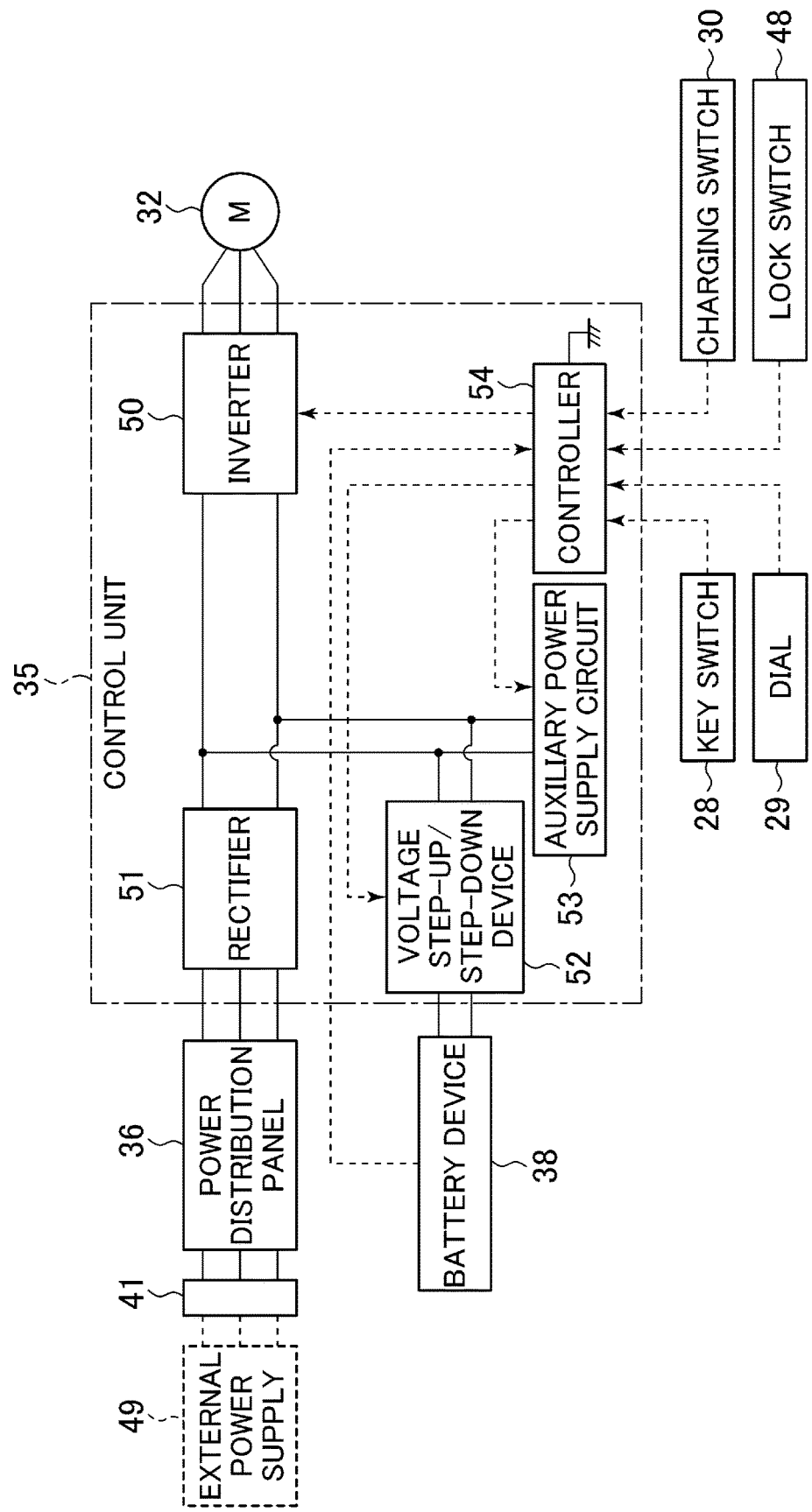
FIG. 4 is a block diagram representing a control unit configuration together with related devices in the first embodiment of the present invention.
Figure 5:
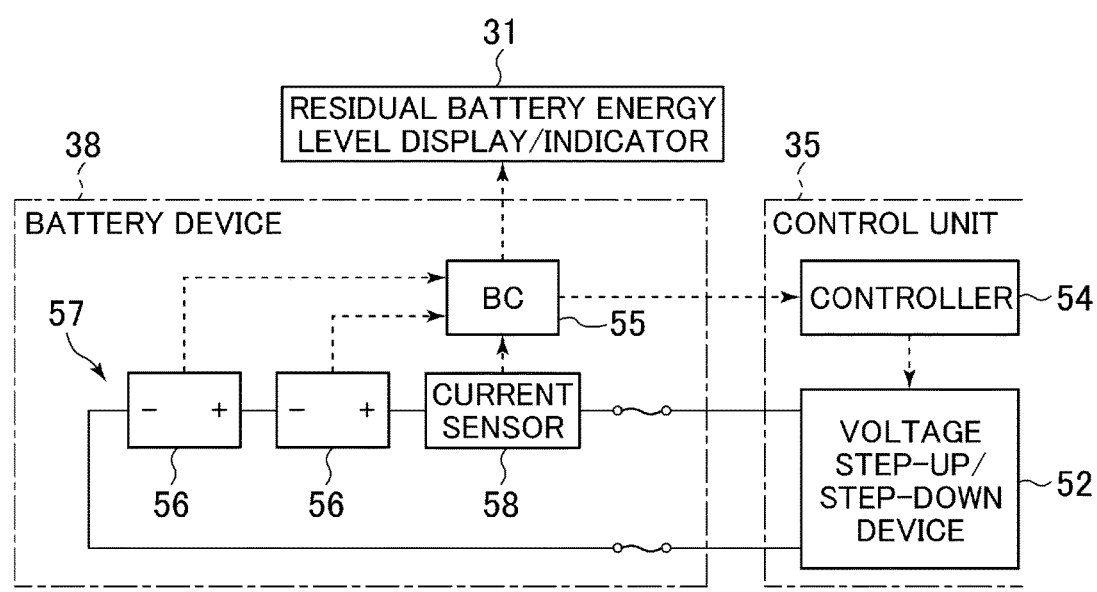
FIG. 5 is a block diagram representing a battery device configuration together with related devices in the first embodiment of the present invention.

FIG. 4 is a block diagram representing the configuration of the control unit 35 together with related devices in the present embodiment. FIG. 5 is a block diagram representing the configuration of the battery device 38 together with related devices in the present embodiment.

Referring to FIGS. 4 and 5, the control unit 35 has a battery driving function (battery driver) that supplies to the electric motor 32 the electric power received from the battery device 38, and a battery charging function (battery charger) that if an external power supply 49 is connected in the external power supply input section 41, supplies to the battery device 38 the electric power received from the external power supply 49 via the external power supply input section 41 and the power distribution panel 36. More specifically, the control unit 35 includes an inverter 50, a rectifier 51, a voltage step-up/step-down device 52, an auxiliary power supply circuit 53, and a controller 54; wherein the inverter 50 and the voltage step-up/step-down device 52 correspond to the battery driver, and the rectifier 51 and the voltage step-up/step-down device 52 correspond to the battery charger.

The inverter 50 is cable-connected to the motor 32. The rectifier 51 is connected to the external power supply input section 41 via the distribution panel 36. The voltage step-up/step-down device 52 is connected to the inverter 50 and the rectifier 51, the device 52 also being cable-connected to the battery device 38. The controller 54 controls the inverter 50, the voltage step-up/step-down device 52, and the auxiliary power supply circuit 53, and is adapted to communicate with a battery controller 55 of the battery device 38 (the battery controller 55 is described later). The auxiliary power supply circuit (step-down device) 53 steps down the power from the battery device 38 and then supplies the stepped-down power to the controller 54, the battery controller 55, and other electronic devices.

The battery device 38 includes a battery system 57, in which a plurality of internal batteries 56 are interconnected in series (in FIG. 5, only two of these batteries are conveniently shown), a current sensor 58, and the battery controller (BC) 55. Although not shown in detail, the batteries 56 each include, for example, a plurality of cells made of a lithium-ion material, with a cell controller to monitor the cells. Each cell controller acquires information about each battery 56 (more specifically, voltage, temperature, and other state quantity relating to the battery 56) and outputs the information to the battery controller 55. The current sensor 58 detects a current of the battery system 57 and outputs the value to the battery controller 55.

The battery controller 55 computes a total voltage of the battery system 57 from the voltages of the batteries 56 that the controller 55 has acquired from the cell controllers, and further computes a residual battery energy level of the battery system 57 from the computed total voltage and the current that the controller 55 has acquired from the current sensor 58. After that, the battery controller 55 transmits the computed total voltage and residual battery energy level of the battery system 57, together with the current acquired from the current sensor 58, to the controller 54 of the control unit 35. Additionally, the battery controller 55 outputs the computed residual battery energy level to the residual battery energy level display/indicator 31, which then displays/indicates the computed value.

Furthermore, the battery controller 55 uses the acquired battery information from the each cell controller to determine whether an abnormality is occurring in the battery system 57, and if the battery system is determined to be abnormal, the battery controller 55 transmits an error signal to the controller 54 of the control unit 35.

In addition to signals from the battery controller 55 of the battery device 38, signals from the key switch 28, dial 29, charging switch 30, lock switch 48, and other elements mentioned above, are input to the controller 54 of the control unit 35. The key switch 28, which specifies a battery driving mode and the like, outputs an appropriate signal according to a particular rotational operating position (OFF position, ON position, or START position) of the key. The dial 29, which specifies a target rotational speed for the electric motor 32, outputs a target speed signal corresponding to the rotational operating position. The charging switch 30, which specifies a battery charging mode, outputs a signal, depending on an operating position (OFF position or ON position) of the switch 30.

Depending on the above-mentioned signals and the like, the controller 54 of the control unit 35 selectively executes one of the battery driving mode, in which the controller 54 drives the electric motor 32 by supplying to the motor 32 the electric power that has been supplied from the battery device 38, and the battery charging mode, in which the controller 54 charges the battery system 57 by supplying to the battery system 57 the electric power that has been supplied from the external power supply 49. Details of the two modes are described below.

(1) Battery Driving Mode

In accordance with the signal from the key switch 28, the controller 54 of the control unit 35 determines whether the key switch 28 has been actuated to the START position, for example, and depending on whether the relevant signal has been input from the lock switch 48, determines whether the gate lock lever 27 is placed in the entry/exit inhibiting position (the lowered position). The controller 54 starts the battery driving mode if both determination results are positive.

At this time, the controller 54 outputs a step-up command to the voltage step-up/step-down device 52. In response to this command, the voltage step-up/step-down device 52 increases a 160-V voltage of the DC power from the battery device 38 nearly to 270 V. The controller 54 also outputs to the inverter 50 a command corresponding to the target motor speed specified by the dial 29. In response to this command, the inverter 50 converts the DC power from the voltage step-up/step-down device 52 into AC power and supplies the AC power to the electric motor 32. In other words, the inverter 50 controls an applied voltage of the electric motor 32 so that an actual speed of the motor 32 equals the target speed.

In addition, the controller 54 determines, for example, whether the residual battery energy level of the battery system 57 that the controller 54 has received from the battery controller 55 is less than a previously set value (e.g., 20% of a maximum energy storage capacity), and if the residual battery energy level is less than the previously set value, the controller 54 outputs a stopping command to the inverter 50 and the voltage step-up/step-down device 52. The controller 54 also outputs the stopping command to the inverter 50 and the voltage step-up/step-down device 52 if the controller 54 receives an error signal from the battery controller 55 (in other words, if an abnormality occurs in the battery system 57). Furthermore, if in accordance with the signal from the key switch 28 the controller 54 determines the key switch 28 to have been actuated to the OFF position, the controller 54 outputs the stopping command to the inverter 50 and the voltage step-up/step-down device 52. In response to this command, the inverter 50 and the voltage step-up/step-down device 52 stop operating, which in turn deactivates the electric motor 32 as well.

(2) Battery Charging Mode

In accordance with the signal from the key switch 28, the controller 54 of the control unit 35 determines whether the key switch 28 is placed in the OFF position, for example, and depending on whether the relevant signal has been input from the charging switch 30, determines whether the charging switch 30 has been actuated to the ON position. The controller 54 starts the battery charging mode if both determination results are positive.

At this time, for example if the external power supply 49 connected in the external power supply input section 41 is a three-phase 200-VAC power supply 49A (see FIG. 11 described later), the rectifier 51 converts the 200-VAC power supplied from the three-phase 200-VAC power supply 49A into 270-VDC power. In addition, the controller 54 outputs a step-down command to the voltage step-up/step-down device 52. In response to this command, the voltage step-up/step-down device 52 reduces the 270-V voltage of the DC power from the rectifier 51 nearly to 160 V and then supplies the DC power to the battery device 38.

For example, if the external power supply 49 connected in the external power supply input section 41 is a single-phase 100-VAC power supply 49B (see FIG. 11 described later), the rectifier 51 converts the 100-VAC power supplied from the single-phase 100-VAC power supply 49B into 90-VDC power. In addition, the controller 54 outputs a step-up command to the voltage step-up/step-down device 52. In response to this command, the voltage step-up/step-down device 52 increases the 90-V voltage of the DC power from the rectifier 51 nearly to 160 V and then supplies the DC power to the battery device 38.

For example if the external power supply 49 connected in the external power supply input section 41 is a 200-VDC power supply 49C (see FIG. 11 described later), the controller 54 outputs a step-down command to the voltage step-up/step-down device 52. In response to this command, the voltage step-up/step-down device 52 reduces the 200-V voltage of the DC power from the 200-VDC power supply 49C nearly to 160 V and then supplies the DC power to the battery device 38.

In addition, the controller 54 determines, for example, whether the residual battery energy level of the battery system 57 that the controller 54 has received from the battery controller 55 has reached a maximum value, and if the maximum value has been reached, the controller 54 outputs the stopping command to the voltage step-up/step-down device 52. The controller 54 also outputs the stopping command to the voltage step-up/step-down device 52 if the supply of power from the external power supply 49 is suspended for a certain time or if the controller 54 receives an error signal from the battery controller 55 (in other words, if an abnormality occurs in the battery system 57). Furthermore, if, depending on whether the relevant signal has been received from the charging switch 30, the controller 54 determines whether the charging switch 30 has been actuated to the OFF position, and if the operating position of the charging switch 30 is OFF, the controller 54 outputs the stopping command to the voltage step-up/step-down device 52. In response to this command, the voltage step-up/step-down device 52 stops operating, which in turn stops the charging of the battery system 57.

Next, the external power supply input section 41 is described. Three connectors, namely 59A, 59B, and 59C, that correspond to the three-phase 200-VAC power supply 49A, single-phase 100-VAC power supply 49B, and 200-VDC power supply 49C described above, are provided in the external power supply input section 41 (for the connectors, see FIGS. 6 to 11 described later herein). That is to say, a plug 60A for the three-phase 200-VAC power supply 49A can be connected to the connector 59A, a plug 60B for the single-phase 100-VAC power supply 49B can be connected to the connector 59B, and a plug 60C for the 200-VDC power supply 49C can be connected to the connector 59C. The external power supply input section 41 is configured so as to selectively open one of the connectors 59A, 59B, 59C to make it connectable to corresponding one of the external power supplies, and so as to block the other connectors to make each of these connectors unconnectable to the corresponding external power supplies. Briefly the external power supply input section 41 is configured so that only one kind of external power supply can be connected at a time. Details of this are described below.

Figure 6:
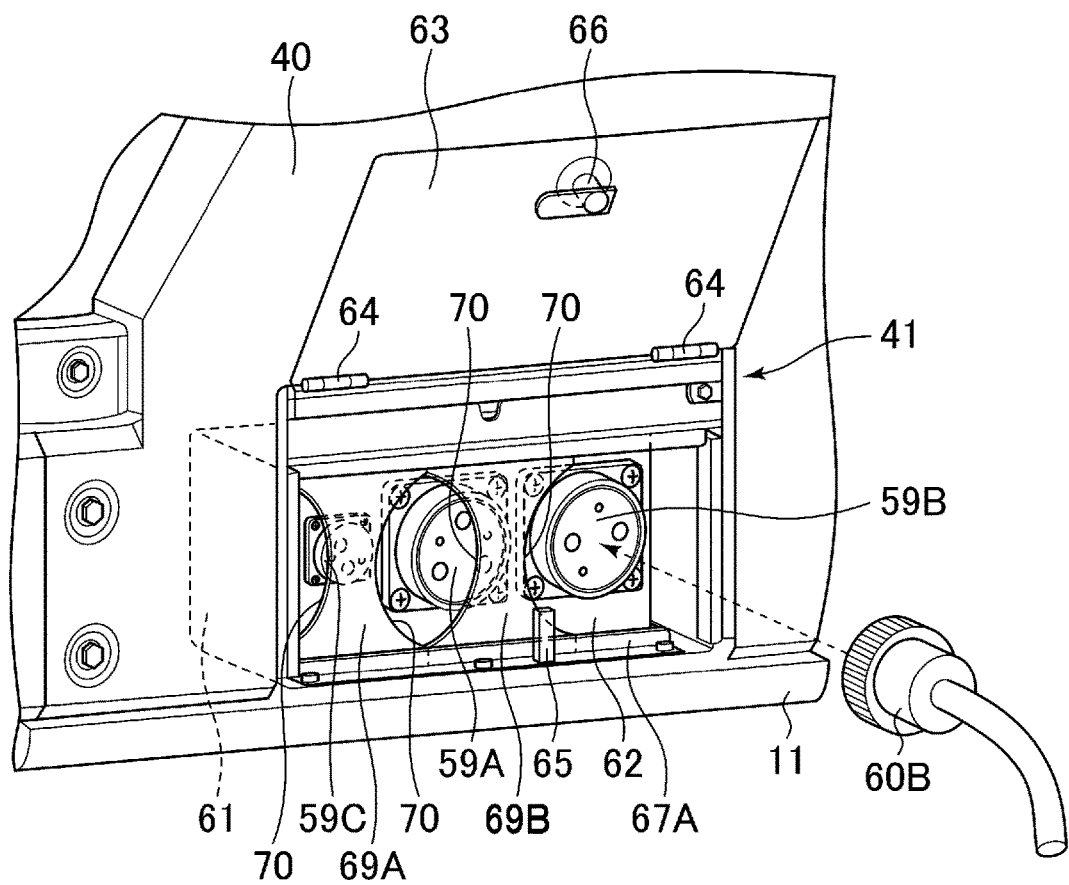
FIG. 6 is a perspective view that represents construction of an external power supply input section in the first embodiment of the present invention.
Figure 7:
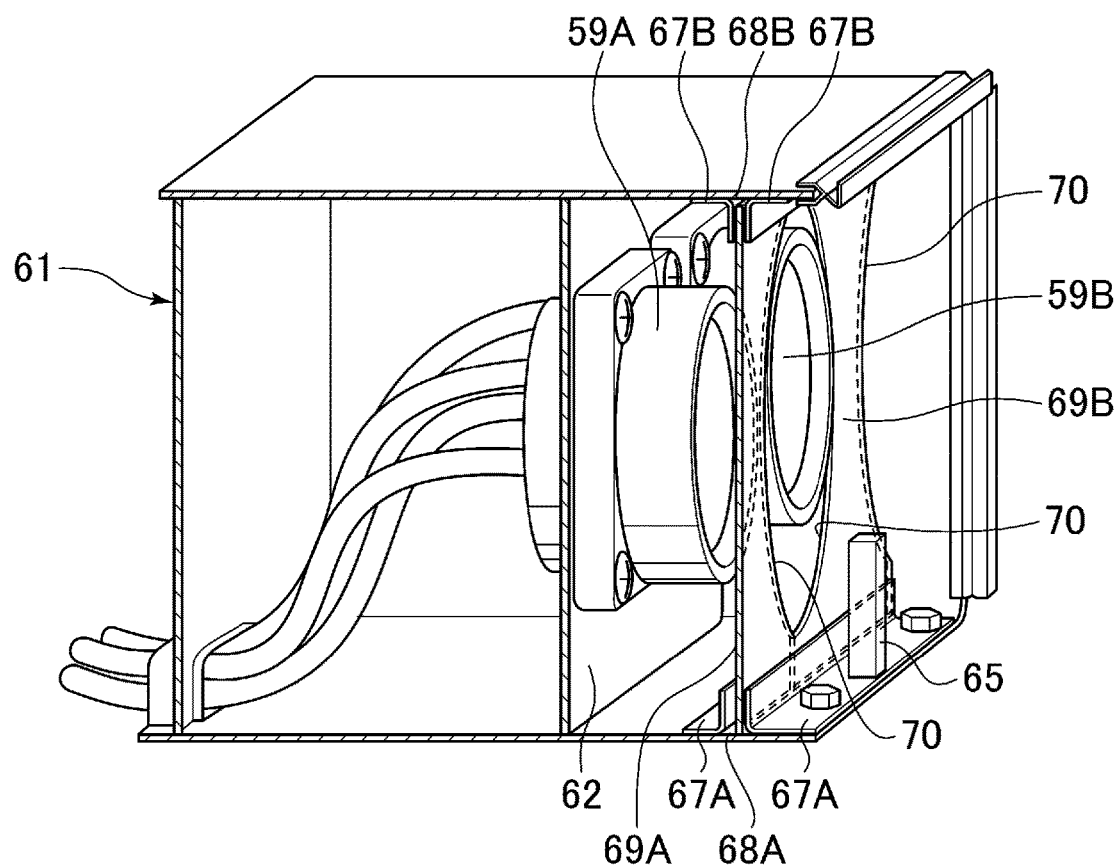
FIG. 7 is a cross-sectional perspective view that represents construction of a casing, connector mounting plate, sliding plates, and other elements, each shown in FIG. 6.
Figure 8:
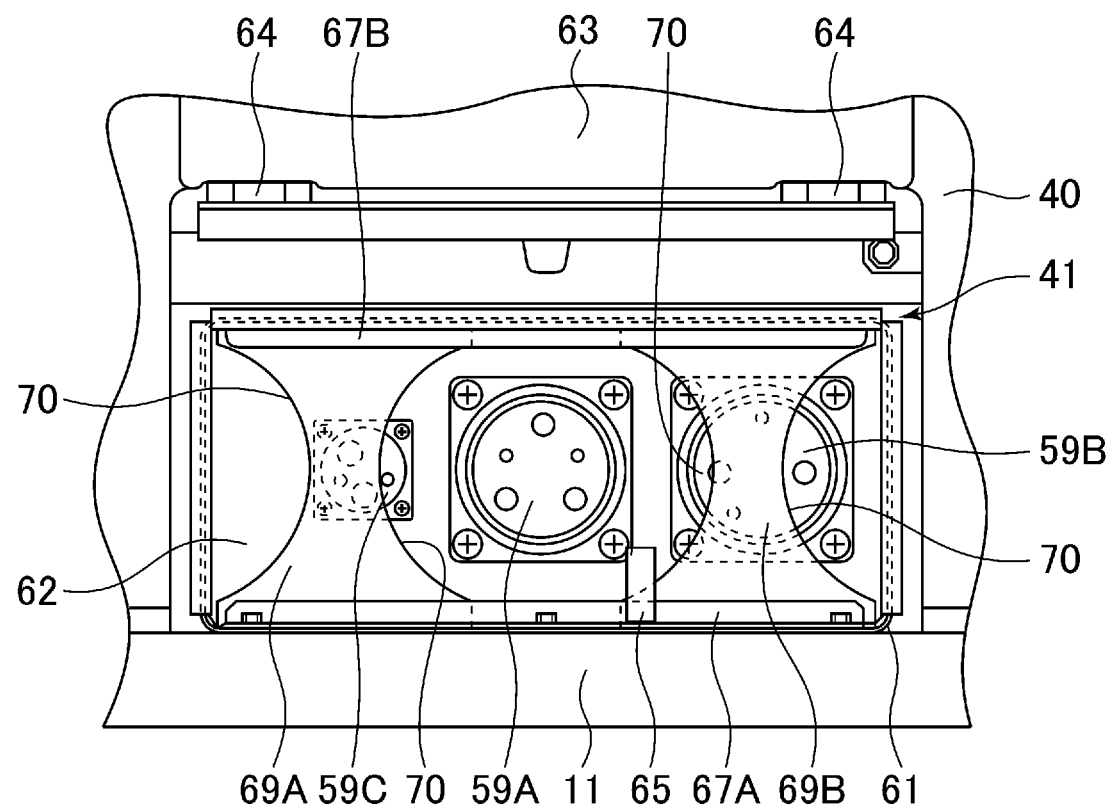
FIG. 8 is a side view that represents the construction of the external power supply input section in the first embodiment of the present invention, the side view showing a state in which a connector for a three-phase AC power supply is open and other connectors are blocked.
Figure 9:
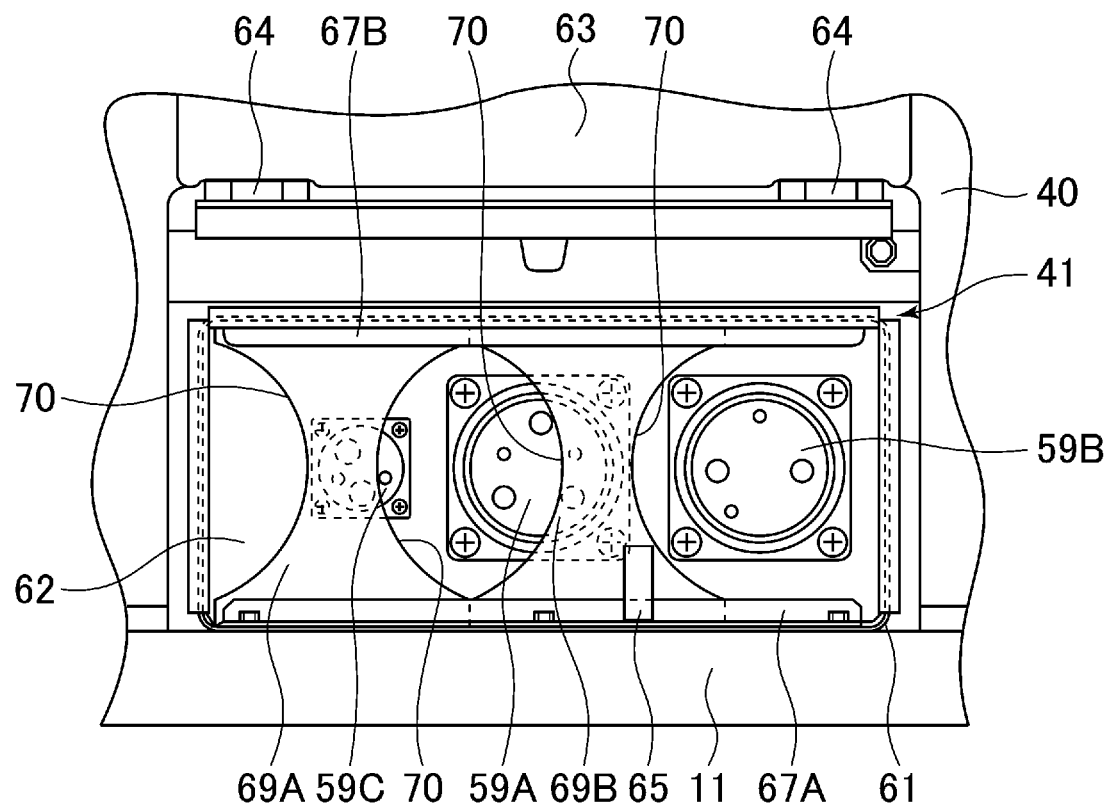
FIG. 9 is another side view that represents the construction of the external power supply input section in the first embodiment of the present invention, the side view showing a state in which a connector for a single-phase AC power supply is open and other connectors are blocked.
Figure 10:
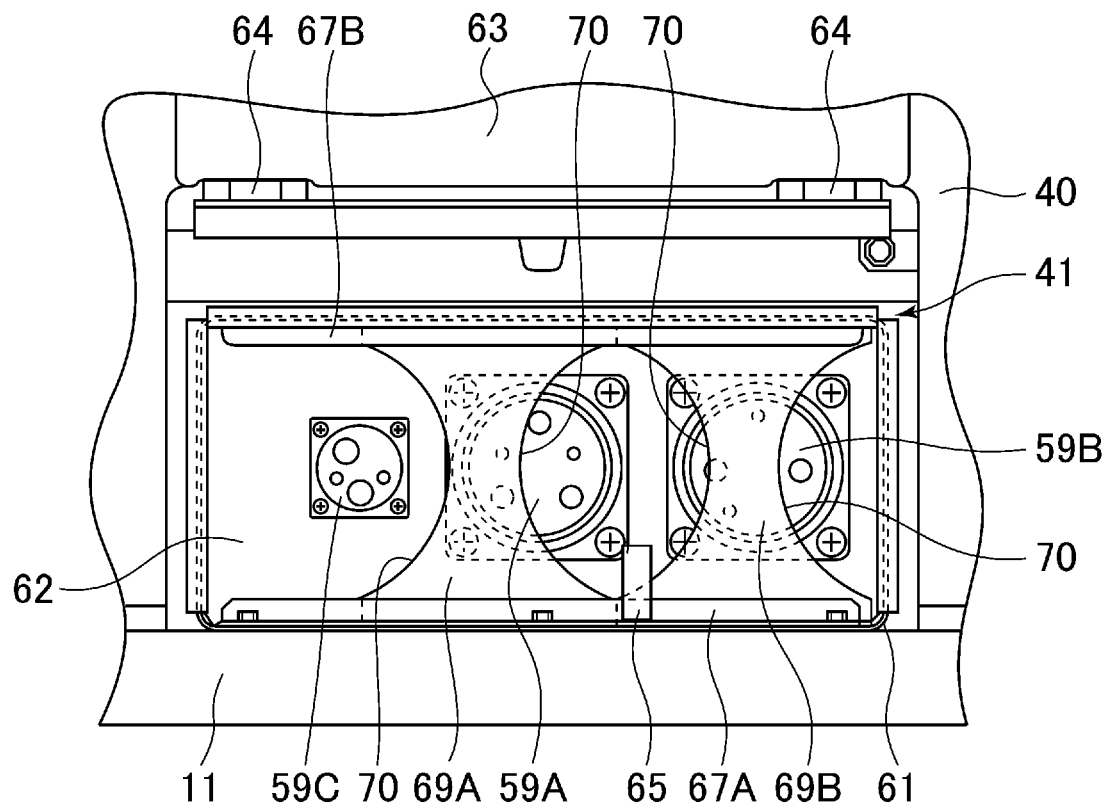
FIG. 10 is yet another side view that represents the construction of the external power supply input section in the first embodiment of the present invention, the side view showing a state in which a connector for a DC power supply is open and other connectors are blocked.

FIG. 6 is a perspective view that represents construction of the external power supply input section 41 in the present embodiment, and FIG. 7 is a cross-sectional perspective view that represents construction of a casing, connector mounting plate, sliding plates, and other elements, each shown in FIG. 6. FIGS. 8 to 10 are side views that represent the construction of the external power supply input section 41 in the present embodiment.

Referring to FIGS. 6-10, the external power supply input section 41 includes a rectangularly parallelepiped casing 61 mounted on the swing frame 11, and a connector mounting plate 62 mounted on the casing 61. Inside the connector mounting plate 62, the connectors 59A, 59B, 59C are arranged in the front-rear direction (i.e., in a horizontal direction as shown in the figures). In addition, a lid body 63 forming a part of the left side cover 40 is mounted so as to be turnable in a vertical direction via hinges 64, thus allowing the external power supply input section 41 to be opened and closed. The casing 61 comes with a fixing bracket 65, and the lid body 63 has a locking mechanism 66 that can be engaged with the fixing bracket 65.

At a lower-surface side of the casing 61, one pair of bent plates 67A each having an L-shaped form in cross section and extending in the front-rear direction are mounted, and a guide groove 68A is formed between the bent plates 67A. Similarly at an upper-surface side of the casing 61, one pair of bent plates 67B each having an L-shaped form in cross section and extending in the front-rear direction are mounted, and a guide groove 68B is formed between the bent plates 67B. Sliding plates 69A and 69B have respective upper and lower ends slidably inserted in the guide grooves 68A, 68B. Thus the sliding plates 69A, 69B are supported slidably in the front-rear direction (in other words, in the direction that the connectors 59A, 59B, 59C are arranged) without overlapping on each other in a plate thickness direction of the sliding plates. Both front and rear edges of each sliding plate 69A, 69B are formed into a shape of a substantially semi-circular notch 70.

For example, as shown in FIG. 8, if the sliding plate 69A is slid to the front side (the left side in the figure) and the sliding plate 69B is slid to the rear side (the right side in the figure), that is, if the sliding plates 69A, 69B are moved away from one another, then the connector 59A is opened and the connectors 59C, 59B are blocked with the sliding plates 69A, 69B. This renders the plug 60A for the three-phase 200-VAC power supply 49A connectable to the connector 59A, renders the plug 60B for the single-phase 100-VAC power supply 49B unconnectable to the connector 59B, and renders the plug 60C for the 200-VDC power supply 49C unconnectable to the connector 59C.

For example, as shown in FIG. 9, if the sliding plates 69A, 69B are slid to the front side while abutting on one another, the connector 59B is opened and the connectors 59C, 59A are blocked with the sliding plates 69A, 69B. This renders the plug 60B for the single-phase 100-VAC power supply 49B connectable to the connector 59B, renders the plug 60C for the 200-VDC power supply 49C unconnectable to the connector 59C, and renders the plug 60A for the three-phase 200-VAC power supply 49A unconnectable to the connector 59A.

For example, as shown in FIG. 10, if the sliding plates 69A, 69B are slid to the rear side while abutting on one another, the connector 59C is opened and the connectors 59A, 59B are blocked with the sliding plates 69A, 69B. This renders the plug 60C for the 200-VDC power supply 49C connectable to the connector 59C, renders the plug 60A for the three-phase 200-VAC power supply 49A unconnectable to the connector 59A, and renders the plug 60B for the single-phase 100-VAC power supply 49B unconnectable to the connector 59B.

Figure 11:
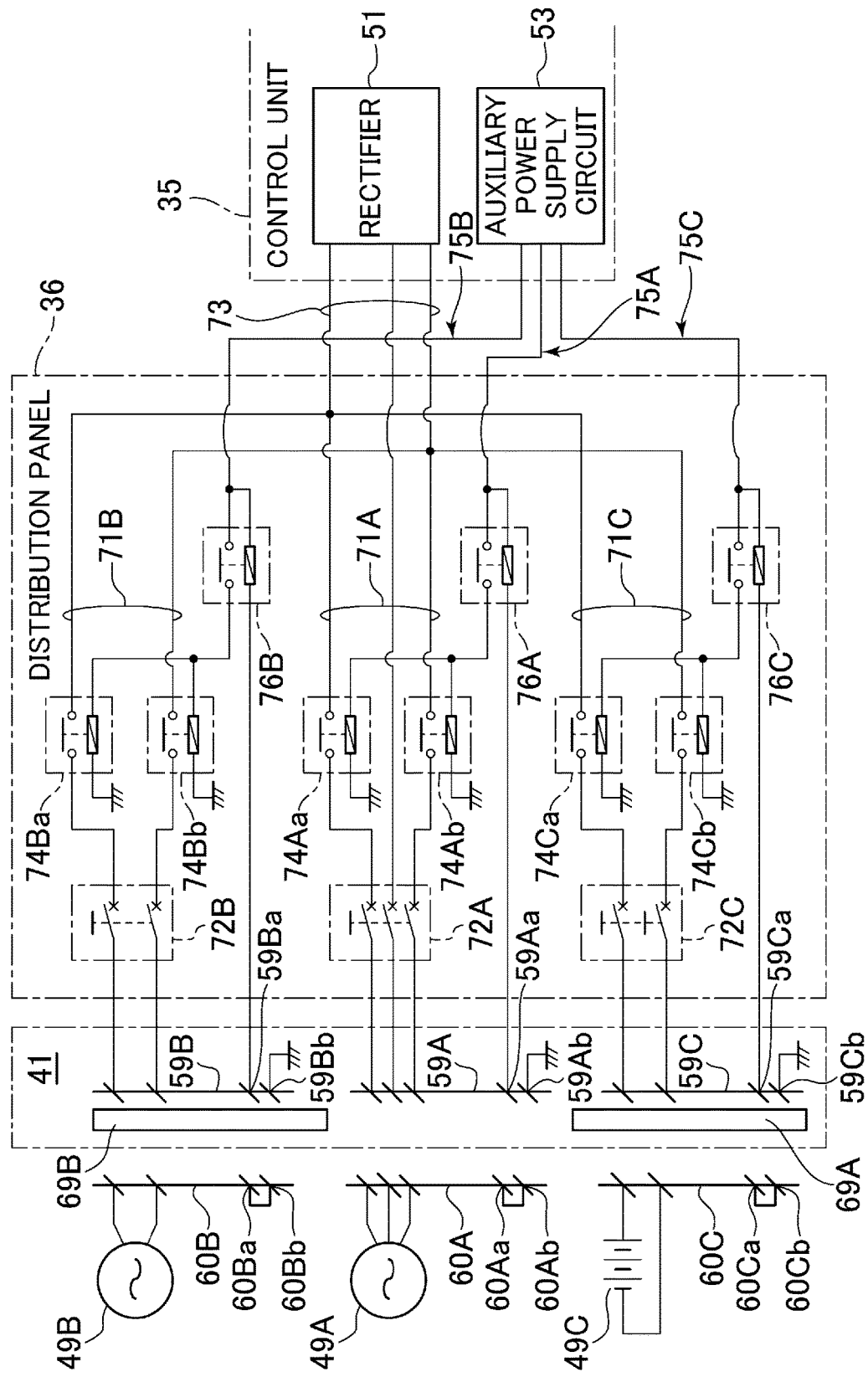
FIG. 11 is an electric circuit diagram representing a power distribution panel configuration together with related devices in the first embodiment of the present invention.

Next, the power distribution panel 36, an essential element of the present embodiment, is described below. FIG. 11 is an electric circuit diagram representing the configuration of the power distribution panel 36 together with related devices in the present embodiment.

Figure 15:
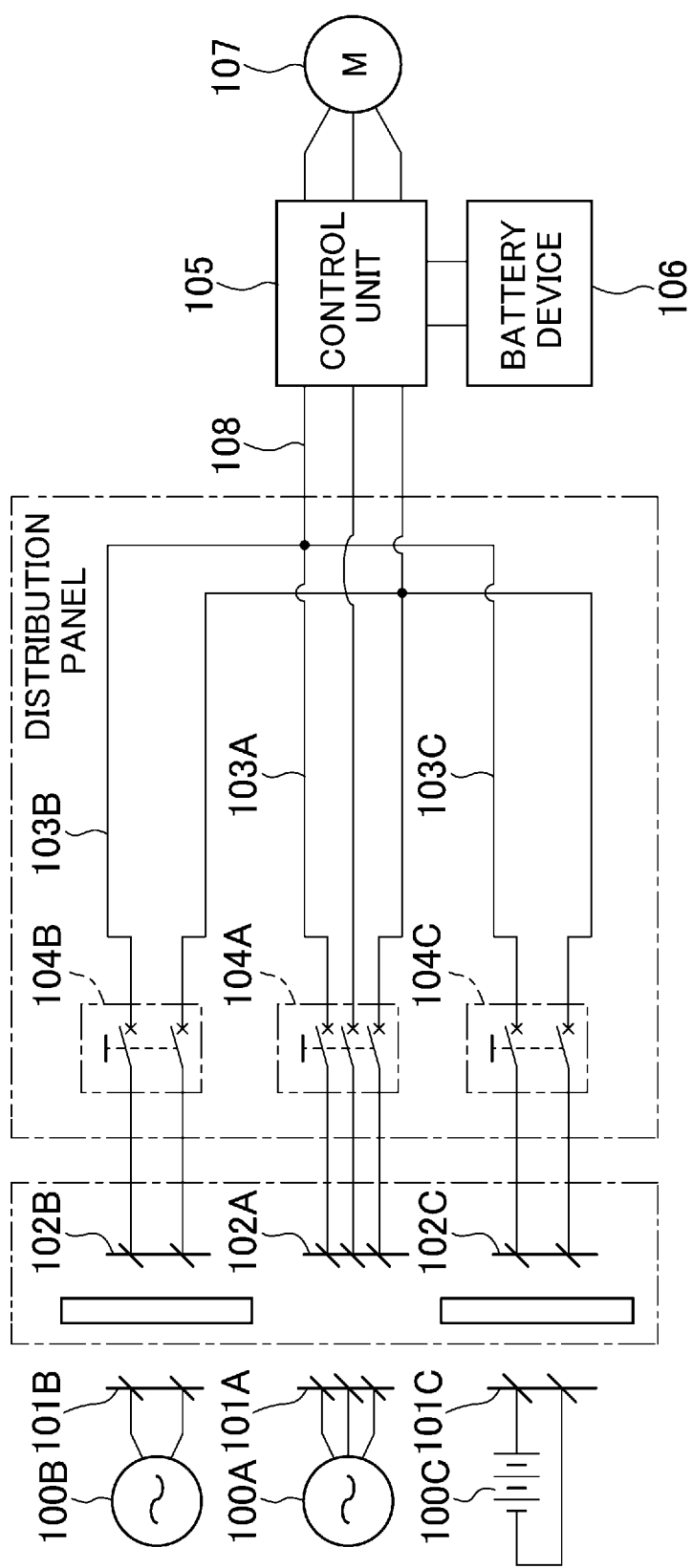
FIG. 15 is an electric circuit diagram representing a power distribution panel configuration together with related devices in a related technique.

Referring to FIG. 11, the distribution panel 36 includes power transmission systems 71A, 71B, and 71C respectively connected to the connectors 59A, 59B, and 59C. The power transmission systems 71A, 71B, and 71C are provided with overcurrent protectors as circuit breakers 72A, 72B, and 72C, respectively. In order to allow for dimensional reduction of the control unit 35, the power transmission systems 71A, 71B, 71C are all caused to join with one common system 73 at a junction before being connected to the rectifier 51 of the control unit 35. Accordingly, in the configuration according to the related art discussed earlier herein using FIG. 15, an electric current flowing in through the junction where the power transmission systems join together is likely to flow into the connector(s) to which an external power supply is not connected.

In the present embodiment, therefore, in order to detect the connection between the connector 59A and the plug 60A for the external power supply 49A, the connector 59A includes connector connection detecting terminals 59Aa and 59Ab and the plug 60A includes plug connection detecting terminals 60Aa and 60Ab. In addition, switching relays of a normally open contacts type are arranged as switches 74Aa and 74Ab in the power transmission system 71A and a relay circuit 75A is provided that controls the switches 74Aa, 74Ab. The plug connection detecting terminals 60Aa, 60Ab are connected to one another, and the connector connection detecting terminals 59Ab is connected to a ground-potential body. The relay circuit 75A includes a normally open contacts type of control relay 76A. The control relay 76A has a coil connected at its negative side to the connector connection detecting terminals 59Aa, and connected at its positive side to the auxiliary power supply circuit 53 of the control unit 35. Furthermore, the switches 74Aa, 74Ab have their coils connected at a negative side to the ground-potential body and connected at a positive side to the auxiliary power supply circuit 53 via contact points of the control relay 76A. For example, if the connector 59A and the plug 60A for the external power supply 49A are connected, then the connector connection detecting terminals 59Aa and the plug connection detecting terminals 60Aa are connected, the connector connection detecting terminals 59Ab and the plug connection detecting terminals 60Ab are connected, and the control relay 76A is connected at the negative side of its coil to the ground-potential body. Thus the coil of the control relay 76A is energized, which in turn switches the contacts of the control relay 76A from an open state to a closed state, then energizes the coils of the switches 74Aa, 74Ab via the contacts of the control relay 76A, and switches contact points of the switches 74Aa, 74Ab from an open state to a closed state.

Similarly, in order to detect the connection between the connector 59B and the plug 60B for the external power supply 49B, the connector 59B includes connector connection detecting terminals 59Ba and 59Bb and the plug 60B includes plug connection detecting terminals 60Ba and 60Bb. In addition, switching relays of the normally open contacts type are arranged as switches 74Ba and 74Bb in the power transmission system 71B and a relay circuit 75B is provided that controls the switches 74Ba, 74Bb. The plug connection detecting terminals 60Ba, 60Bb are connected to one another, and the connector connection detecting terminals 59Bb is connected to a ground-potential body. The relay circuit 75B includes a normally open contacts type of control relay 76B. The control relay 76B has a coil connected at its negative side to the connector connection detecting terminals 59Ba, and connected at its positive side to the auxiliary power supply circuit 53 of the control unit 35. Furthermore, the switches 74Ba, 74Bb have their coils connected at a negative side to the ground-potential body and connected at a positive side to the auxiliary power supply circuit 53 via contact points of the control relay 76B. For example, if the connector 59B and the plug 60B for the external power supply 49B are connected, then the connector connection detecting terminals 59Ba and the plug connection detecting terminals 60Ba are connected, the connector connection detecting terminals 59Bb and the plug connection detecting terminals 60Bb are connected, and the control relay 76B is connected at the negative side of its coil to the ground-potential body. Thus the coil of the control relay 76B is energized, which in turn switches the contacts of the control relay 76B from an open state to a closed state, then energizes the coils of the switches 74Ba, 74Bb via the contacts of the control relay 76B, and switches contact points of the switches 74Ba, 74Bb from an open state to a closed state.

Likewise, in order to detect the connection between the connector 59C and the plug 60C for the external power supply 49C, the connector 59C includes connector connection detecting terminals 59Ca and 59Cb and the plug 60C includes plug connection detecting terminals 60Ca and 60Cb. In addition, switching relays of the normally open contacts type are arranged as switches 74Ca and 74Cb in the power transmission system 71C and a relay circuit 75C is provided that controls the switches 74Ca, 74Cb. The plug connection detecting terminals 60Ca, 60Cb are connected to one another, and the connector connection detecting terminals 59Cb is connected to a ground-potential body. The relay circuit 75C includes a normally open contacts type of control relay 76C. The control relay 76C has a coil connected at its negative side to the connector connection detecting terminals 59Ca, and connected at its positive side to the auxiliary power supply circuit 53 of the control unit 35. Furthermore, the switches 74Ca, 74Cb have their coils connected at a negative side to the ground-potential body and connected at a positive side to the auxiliary power supply circuit 53 via contact points of the control relay 76C. For example, if the connector 59C and the plug 60C for the external power supply 49C are connected, then the connector connection detecting terminals 59Ca and the plug connection detecting terminals 60Ca are connected, the connector connection detecting terminals 59Cb and the plug connection detecting terminals 60Cb are connected, and the control relay 76C is connected at the negative side of its coil to the ground-potential body. Thus the coil of the control relay 76C is energized, which in turn switches the contacts of the control relay 76C from an open state to a closed state, then energizes the coils of the switches 74Ca, 74Cb via the contacts of the control relay 76C, and switches contact points of the switches 74Ca, 74Cb from an open state to a closed state.

In the above, the connector connection detecting terminals 59Aa, 59Ab, 59Ba, 59Bb, 59Ca, 59Cb and the plug connection detecting terminals 60Aa, 60Ab, 60Ba, 60Bb, 60Ca, 60Cb constitute a detection block that detects whether one of the plurality of connectors described in the accompanying CLAIMS has been connected to corresponding one of the plugs for the external power supplies. In addition, the relay circuits 75A, 75B, 75C constitute a switching control block that controls switching so that among the plurality of switches, only the switches associated with the connector detected by the detection block will close and all the other switches will open.

In the present embodiment of the above configuration, the relay circuits 75A, 75B, 75C operate so that among the plurality of switches 74Aa, 74Ab, 74Ba, 74Bb, 74Ca, 74Cb, only the switches associated with the connector to which the plug for one of the external power supplies is connected will close and all the other switches associated with the connectors to which the plug for the particular external power supply is not connected will open. Thus the current that flows in via the junction where the power transmission systems 71A, 71B, 71C join together can be prevented from flowing into the connectors to which the other two external power supplies are not connected.

While an example in which the control relays 76A, 76B, 76C are connected at the positive sides of the respective coils to the auxiliary power supply circuit 53 of the control unit 35 has been taken in the above description of the embodiment, the present invention is not limited to/by this example and may be modified in various forms without departing from the scope and technical ideas of the invention. That is to say, for example an auxiliary battery may be added and the control relays 76A, 76B, 76C may have the positive sides of their coils connected to the auxiliary battery, in which case, substantially the same advantageous effect as above can also be obtained.

A second embodiment of the present invention is described below referring to FIGS. 12 to 14. In the present embodiment, the same reference number is assigned to each of elements equal to those of the first embodiment, and description of these elements is omitted herein where appropriate.

Figure 12:
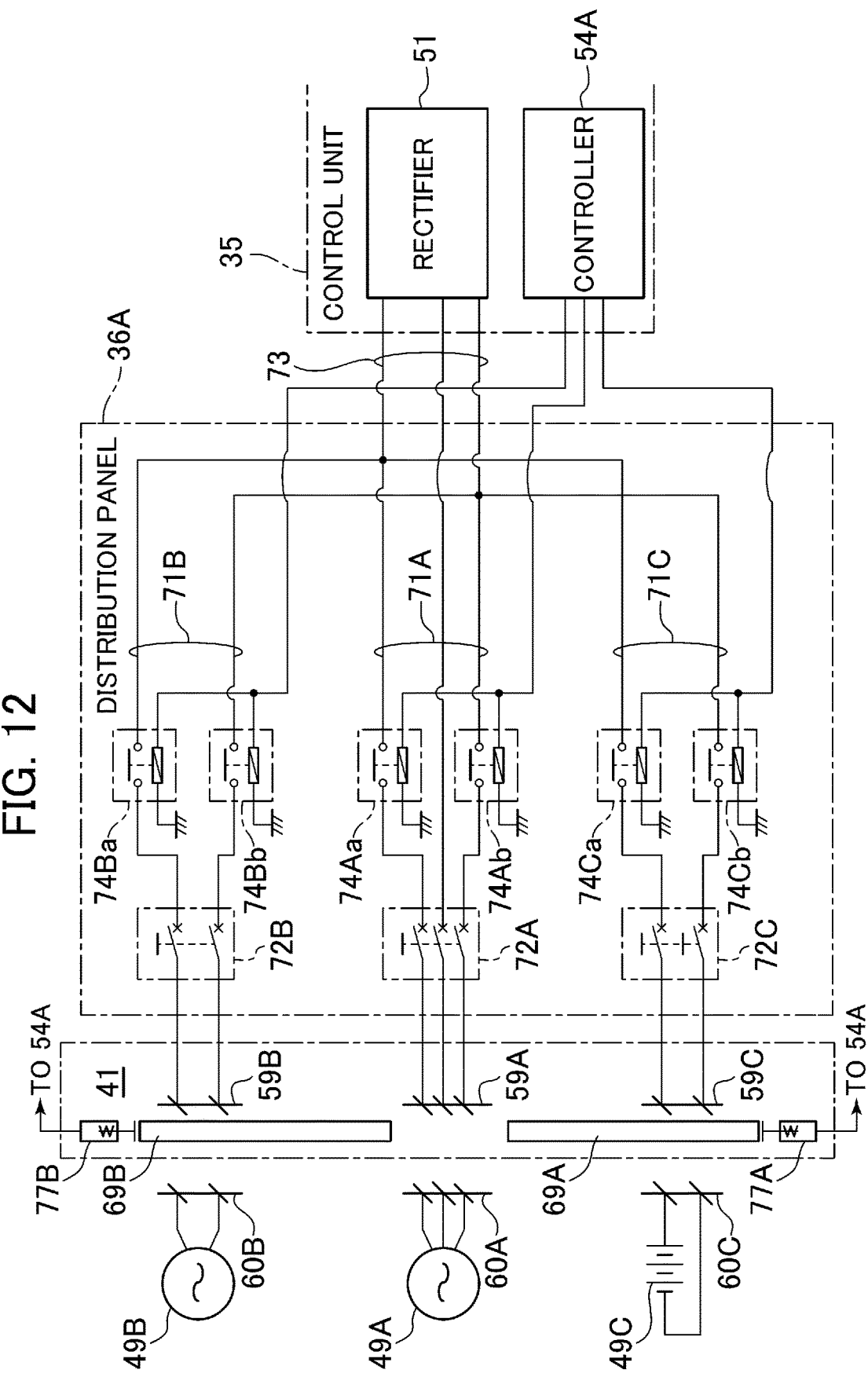
FIG. 12 is an electric circuit diagram representing a power distribution panel configuration together with related devices in a second embodiment of the present invention.

FIG. 12 is an electric circuit diagram representing a configuration of a power distribution panel 36A together with related devices in the present embodiment. FIG. 13 is a side view that represents layout of limit switches together with an external power supply input section 41 in the present embodiment.

In the present embodiment, limit switches 77A, 77B that detect sliding positions of sliding plates 69A, 69B respectively are disposed in a casing 61 of the external power supply input section 41. The limit switch 77A detects whether the sliding plate 69A has reached a predetermined front sliding position, and outputs a result of the detection as a detection signal. The limit switch 77B detects whether the sliding plate 69B has reached a predetermined rear sliding position, and outputs a result of the detection as a detection signal.

A controller 54A of a control unit 35 controls opening/closing of switches 74Aa, 74Ab, 74Ba, 74Bb, 74Ca, 74Cb according to the detection signals received from the limit switches 77A, 77B. A sequence of the opening/closing control which the controller 54A conducts is described below using FIG. 14. FIG. 14 is a flowchart that represents details of processing which relates to switching control by the controller 54A in the present embodiment.

In step 80, the controller 54A determines whether battery charging mode is selected. For example if the battery charging mode is not selected, the determination in step 80 is not met and the sequence skips to step 81. In step 81, no control signal is output to any of coils present inside the switches 74Aa, 74Ab, 74Ba, 74Bb, 74Ca, 74Cb and hence contacts of all the switches 74Aa, 74Ab, 74Ba, 74Bb, 74Ca, 74Cb are opened. Conversely if the battery charging mode is selected, the determination in step 80 is met and the sequence proceeds to step 82.

In step 82, the controller 54A determines from presence/absence of the detection signals from the limit switches 77A, 77B whether one of connectors 59A, 59B, and 59C can be connected to a plug assigned to an applicable external power supply. Next, the controller 54A proceeds to step 83, in which it outputs a control signal only to the coils of switches associated with the connector which has been determined to be able to accept the plug for the applicable external power supply, and closes the contacts of the corresponding switches. The controller 54A does not output the control signal to the coils of any switches other than those associated with the connector which has been determined to be able to accept the plug for the applicable external power supply, and hence opens the contacts of the non-corresponding switches.

Figure 13:
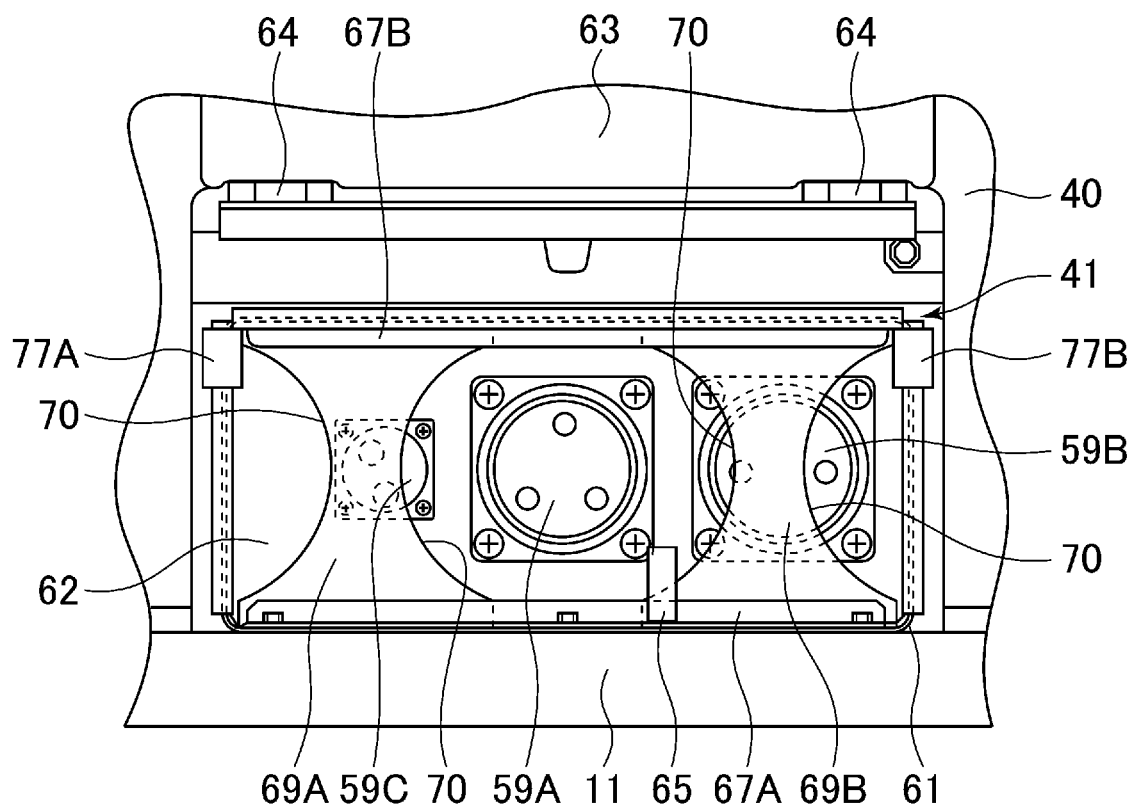
FIG. 13 is a side view that represents layout of limit switches together with an external power supply input section in the second embodiment of the present invention.
Figure 14:
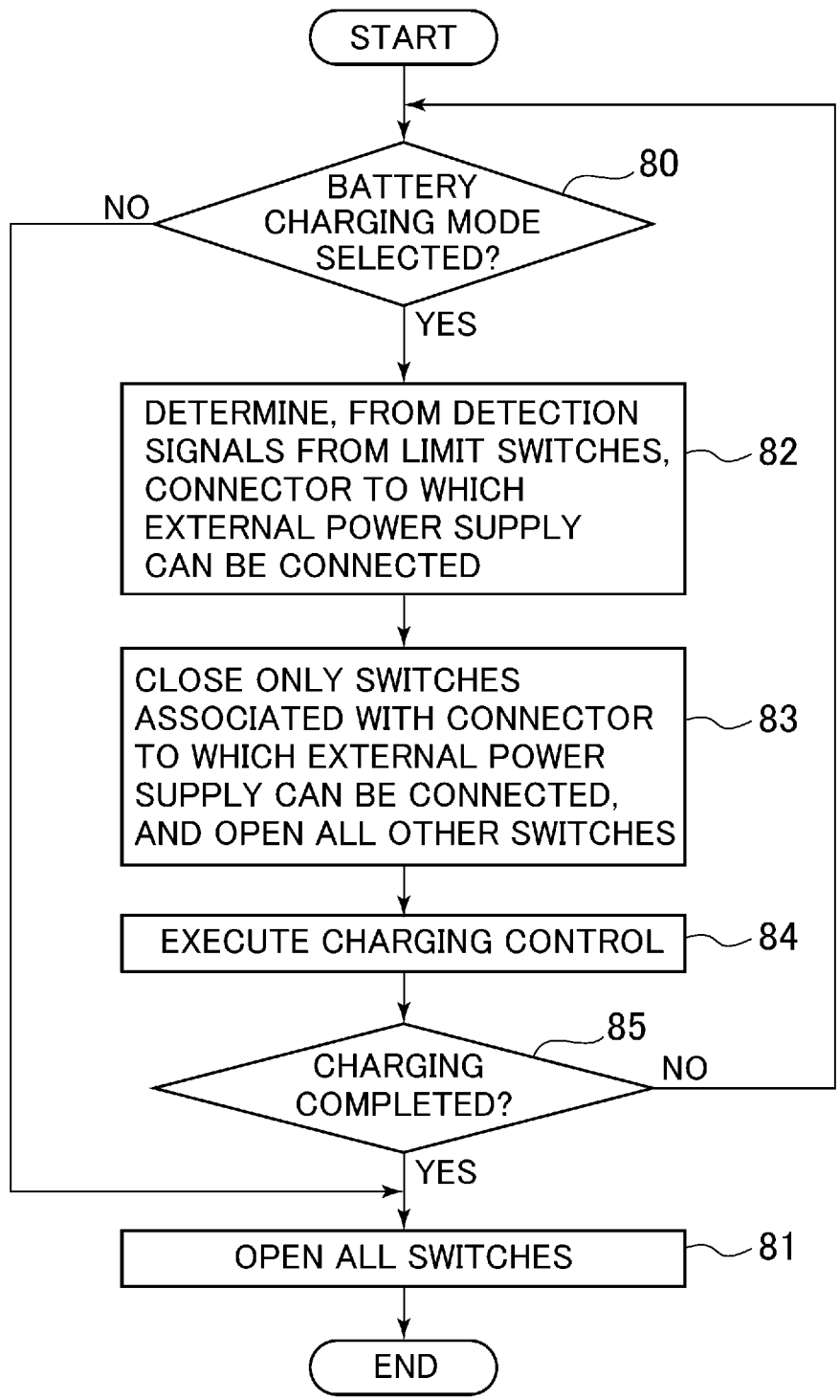
FIG. 14 is a flowchart that represents details of processing which relates to switching control by a controller in the second embodiment of the present invention.

To be more specific, for example if the detection signal from the limit switch 77A is present and the detection signal from the limit switch 77B is also present, the controller 54A determines the connector 59A to be connectable to the plug for the applicable external power supply, and the connectors 59B, 59C not to be connectable to the plug for the applicable external power supply (see FIGS. 13 and 8). Next, the controller 54A outputs the control signal to the coils of the switches 74Aa,74Ab associated with the connector 59A, and closes the contacts of the switches 74Aa,74Ab. The controller 54A does not output the control signal to the coils of the switches 74Ba, 74Bb, 74Ca, 74Cb associated with the connectors 59B, 59C, and hence opens the contacts of the switches 74Ba, 74Bb, 74Ca, 74Cb.

In another example, in which the detection signal from the limit switch 77A is present and the detection signal from the limit switch 77B is absent, the controller 54A determines the connector 59B to be connectable to the plug for the applicable external power supply, and the connectors 59C, 59A not to be connectable to the plug for the applicable external power supply (see FIG. 9). Next, the controller 54A outputs the control signal to the coils of the switches 74Ba, 74Bb associated with the connector 59B, and closes the contacts of the switches 74Ba, 74Bb. The controller 54A does not output the control signal to the coils of the switches 74Ca, 74Cb, 74Aa, 74Ab associated with the connectors 59C, 59A, and hence opens the contacts of the switches 74Ca, 74Cb, 74Aa, 74Ab.

In yet another example, in which the detection signal from the limit switch 77A is absent and the detection signal from the limit switch 77B is present, the controller 54A determines the connector 59C to be connectable to the plug for the applicable external power supply, and the connectors 59A, 59B not to be connectable to the plug for the applicable external power supply (see FIG. 10). Next, the controller 54A outputs the control signal to the coils of the switches 74Ca, 74Cb associated with the connector 59C, and closes the contacts of the switches 74Ca, 74Cb. The controller 54A does not output the control signal to the coils of the switches 74Aa, 74Ab, 74Ba, 74Bb associated with the connectors 59A, 59B, and hence opens the contacts of the switches 74Aa, 74Ab, 74Ba, 74Bb.

After completing one of the above three determinations, the controller 54A proceeds to step 84 to output a step-up command or step-down command to a voltage step-up/step-down device 52 and execute charging control. Next, the controller 54A proceeds to step 85 to determine whether charging has been completed. For example, if charging is not completed, the determination in step 85 is not met, so the controller 54A returns to step 80 to repeat the above sequence. For example if the charging control in step 84 is continued and charging is completed, the determination in step 85 is met and the sequence proceeds to step 81. In step 81, no control signal is output to the coils of any of the switches 74Aa, 74Ab, 74Ba, 74Bb, 74Ca, 74Cb and hence the contacts of all the switches 74Aa, 74Ab, 74Ba, 74Bb, 74Ca, 74Cb are opened.

In the above, the limit switches 76A, 76B constitute a detection block that detects whether one of the plurality of connectors described in the accompanying CLAIMS has been selected for connection to corresponding one of the plugs for the external power supplies. In addition, the controller 54A of the control unit 35 constitutes a switching control block that controls switching so that among the plurality of switches, only the switches associated with the connector detected by the detection block will close and all the other switches will open.

In the present embodiment of the above configuration, the controller 54A determines from the detection signals from the limit switches 77A, 77B the connector to which the plug for one of the external power supplies can be connected. Next, the controller 54A controls switching so that among the plurality of switches 74Aa, 74Ab, 74Ba, 74Bb, 74Ca, 74Cb, only the switches associated with the connector to which the plug for one of the external power supplies can be connected will close and all the other switches will open. Thus, as in the first embodiment, a current that flows in via a junction at which power transmission systems 71A, 71B, 71C join together can be prevented from flowing into the connectors to which the other two external power supplies are not connected.

The second embodiment has been described using an example in which, in addition to the functions of the controller 54 in the first embodiment, the controller 54 of the control unit 35 has a function (that is, switching control block) that conducts the switching control of the switches 74Aa, 74Ab, 74Ba, 74Bb, 74Ca, 74Cb, on the basis of the detection signals received from the limit switches 77A, 77B. The present invention, however, is not limited to/by the example and may be modified in various forms without departing from the scope and technical ideas of the invention. That is to say, for example, the controller (switching control block) that conducts the switching control of the switches 74Aa, 74Ab, 74Ba, 74Bb, 74Ca, 74Cb, on the basis of the detection signals received from the limit switches 77A, 77B, may be disposed independently of the controller 54 of the control unit 35. In this case, substantially the same advantageous effect as above can also be obtained.

In addition, the first and second embodiments have been described using an example in which the control unit 35 has a battery driving function (battery driver) that supplies to the electric motor 32 the electric power received from the battery device 38, and a battery charging function (battery charger) that supplies to the battery device 38 the electric power received from the external power supply 49. The present invention, however, is not limited to/by the example and may be modified in various forms without departing from the scope and technical ideas of the invention. That is to say, the battery driver and the battery charger may be disposed in separate elements. Alternatively, the control unit 35 may further have an external power supply driving function (external power supply driver) that if a three-phase 200-VAC power supply 49A is connected in the external power supply input section 41, supplies to the electric motor 32 the electric power received from the three-phase 200-VAC power supply 49A and thus drives the motor 32, and in that case, the control unit 35 may selectively execute a battery charging mode and an external power supply driving mode in response to operation of a mode selector switch. For example, if the external power supply driving mode is selected, an inverter 50 will convert a DC power input from a rectifier 51 into AC power form in accordance with a target motor speed command from the controller and then supply the AC power to the electric motor 32. In this case, substantially the same advantageous effect as above can also be obtained.

Furthermore, an example in which the plug 60A for the three-phase 200-VAC power supply 49A can be connected to the connector 59A, the plug 60B for the single-phase 100-VAC power supply 49B can be connected to the connector 59B, and the plug 60C for the 200-VDC power supply 49C can be connected to the connector 59C, has been taken in the description of the first and second embodiments. The present invention, however, is not limited to/by the example and may be modified in various forms without departing from the scope and technical ideas of the invention. That is to say, the invention may include, for example, two connectors to each of which one of two kinds of external power supplies can be connected, or at least four connectors to each of which one of at least four kinds of external power supplies can be connected. In these cases, substantially the same advantageous effect as above can also be obtained.

Furthermore, the first and second embodiments have been described using an example in which the electric hydraulic excavator includes the left and right hydraulic track motors 9, the hydraulic swing motor, and more, as hydraulic actuators other than the hydraulic actuators for the work implement (more specifically, the hydraulic boom cylinder 18, the hydraulic arm cylinder 19, and the hydraulic bucket cylinder 20). The present invention, however, is not limited to/by the example. That is to say, the left and right hydraulic track motors 9, for example, may be replaced by left and right electric track motors powered from the battery device 38. Additionally or alternatively, the hydraulic swing motor, for example, may be replaced by an electric swing motor powered from the battery device 38. In these cases, substantially the same advantageous effect as above can also be obtained.

Moreover, while the first and second embodiments have been described using an example in which the electric hydraulic excavator includes a swing type of work implement 4, the excavator may instead include an offset type of work implement without being limited to/by the example. Besides, although an example in which the electric hydraulic excavator includes a crawler type of lower track structure 1 has been described, the excavator may instead include a wheeled lower track structure without being limited to/by the example. In these cases, substantially the same advantageous effect as above can also be obtained.

While the present invention has been described taking the electric hydraulic excavator as an example of an apparatus to which the invention can be applied, it goes without saying that the invention may also be applied to other electric construction machines without being limited to/by the example.

DESCRIPTION OF REFERENCE NUMBERS

9: Hydraulic track motor
14: Hydraulic swing cylinder
18: Hydraulic boom cylinder
19: Hydraulic arm cylinder
20: Hydraulic bucket cylinder
32: Electric motor
33: Hydraulic pump
35: Control unit
36, 36A: Power distribution panel
38: Battery device
41: External power supply input section
49: External power supply 49A: Three-phase 200-VAC power supply (External power supply)
49B: Single-phase 100-VAC power supply (External power supply
49C: 200-VDC power supply (External power supply)
50: Inverter
51: Rectifier
52: Voltage step-up/step-down device
53: Auxiliary power supply circuit
54, 54A: Controllers
55: Battery controller
56: Internal battery
57: Battery system
59A, 59B, 59C: Connectors
59Aa, 59Ab: Connector connection detecting terminals
59Ba, 59Bb: Connector connection detecting terminals
59Ca, 59Cb: Connector connection detecting terminals
60A, 60B, 60C: Plugs
60Aa, 60Ab: Plug connection detecting terminals
60Ba, 60Bb: Plug connection detecting terminals
60Ca, 60Cb: Plug connection detecting terminals
69A, 69B: Sliding plates
71A, 71B, 71C: Power transmission systems
73: Common system
74Aa, 74Ab: Switches
74Ba, 74Bb: Switches
74Ca, 74Cb: Switches
75A, 75B, 75C: Relay circuits
76A, 76B, 76C: Control relays
77A, 77B: Limit switches

The invention claimed is:
1. An electric construction machine comprising:
an electric motor;
a hydraulic pump driven by the electric motor;
hydraulic actuators, each driven by a hydraulic fluid delivered from the hydraulic pump;
an internal battery that is an electric power supply source for the electric motor;
a plurality of connectors to which respective plugs for a plurality of kinds of external power supplies are adapted to be connected;
a sliding plate disposed that while selectively opening one of the plurality of connectors so as to be connectable to the corresponding one of the plugs for the external power supplies, blocks the remaining connectors so as to be unconnectable to the plugs for the external power supplies;
a plurality of power transmission systems each connected to one of the plurality of connectors; and
a battery charger to which the plurality of power transmission systems are connected via one common system, the battery charger being configured so that when any one of the plurality of connectors is connected to corresponding one of the plugs for the external power supplies, the battery charger supplies, to the internal battery, electric power supplied from the corresponding external power supply,
wherein the electric construction machine further comprises:
a plurality of switches, each disposed in one of the plurality of power transmission systems and each associated with one of the plurality of connectors;
a detection block that detects whether one of the plurality of connectors has been connected to corresponding one of the plugs for the external power supplies or whether one of the connectors has been selected for connection to corresponding one of the plugs for the external power supplies; and a switching control block that conducts switching control so that among the plurality of switches, only the switches associated with the connector detected by the detection block will close and all the other switches will open, wherein the detection block includes connector connection detecting terminals each disposed in one of the plurality of connectors and each connected to one of plug connection detecting terminals disposed in the plugs for the external power supplies;

wherein the switching control block is a plurality of relay circuits that each include a control relay associated with a combination of one of the connectors and one of the switches; and wherein the plurality of relay circuits are each constructed so that when the plug for one of the external power supplies is connected to the corresponding one of the plurality of connectors, a coil of the corresponding relay is energized through connection of the corresponding connector connection detecting terminals and plug connection detecting terminals, then a contact point of the corresponding control relay changes to a closed state, then coils of the corresponding switches are energized via the contact point, and contact points of the corresponding switches are switched to a closed state.

2. An electric construction machine comprising:

an electric motor;

a hydraulic pump driven by the electric motor;

hydraulic actuators, each driven by a hydraulic fluid delivered from the hydraulic pump;

an internal battery that is an electric power supply source for the electric motor;

a plurality of connectors to which respective plugs for a plurality of kinds of external power supplies are adapted to be connected;

a sliding plate is disposed that while selectively opening one of the plurality of connectors so as to be connectable to the corresponding one of the plugs for the external power supplies, blocks the remaining connectors so as to be unconnectable to the plugs for the external power supplies;

a plurality of power transmission systems each connected to one of the plurality of connectors; and a battery charger to which the plurality of power transmission systems are connected via one common system, the battery charger being configured so that when any one of the plurality of connectors is connected to corresponding one of the plugs for the external power supplies, the battery charger supplies, to the internal battery, electric power supplied from the corresponding external power supply, wherein the electric construction machine further comprises:

a plurality of switches, each disposed in one of the plurality of power transmission systems and each associated with one of the plurality of connectors;

a detection block that detects whether one of the plurality of connectors has been connected to corresponding one of the plugs for the external power supplies or whether one of the connectors has been selected for connection to corresponding one of the plugs for the external power supplies; and a switching control block that conducts switching control so that among the plurality of switches, only the switches associated with the connector detected by the detection block will close and all the other switches will open, wherein the detection block includes a limit switch that detects a sliding position of the sliding plate; and wherein the switching control block is a controller that conducts switching control so that among the plurality of switches, only the switches associated with a connector determined to be connectable to the corresponding plug for the external power supply will close and all the other switches will open.

* * * * *